Figure 1:
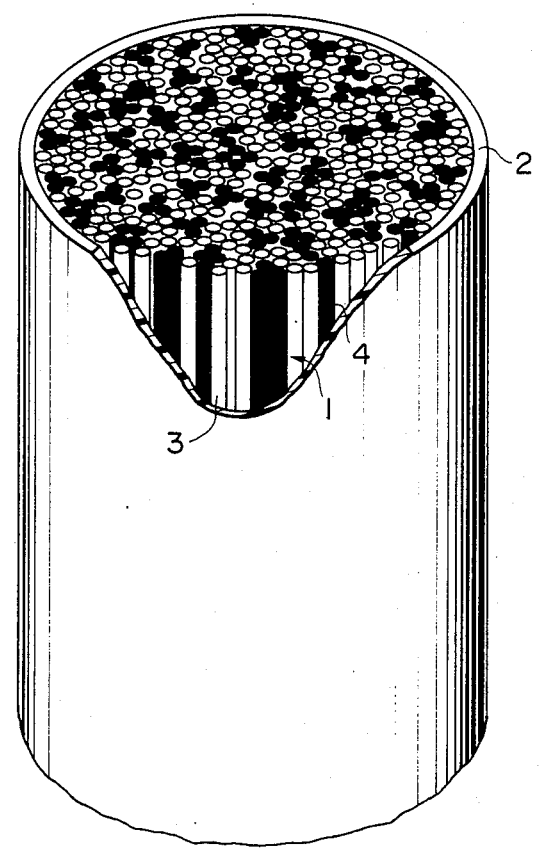

United States Patent [19]

Nakagawa et al.

[11] Patent Number: 4,770,915

[45] Date of Patent: Sep. 13, 1988

[54] FLEXIBLE COMPOSITE MATERIAL AND PROCESS FOR PREPARING SAME

[75] Inventors: Takao Nakagawa; Hiroyuki Uchino, both of Kashiwa; Mihoko Yamashita, Tokyo; Jiro Ichikawa, Chita, all of Japan

[73] Assignees: Fuji Standard Research Inc.; Daido Steel Co.; Fuji Oil Co., Ltd, all of Japan

[21] Appl. No.: 939,700

[22] Filed: Dec. 9, 1986

[30] Foreign Application Priority Data

Dec. 9, 1985 [JP] Japan .................................. 60-276440

[51] Int. Cl.⁴ .......................... B32B 1/04; B32B 3/02
[52] U.S. Cl. ........................... 428/74; 428/294; 428/295; 428/368; 428/373; 428/374; 428/375; 428/376; 428/392; 428/394; 428/395; 428/399; 428/400; 428/401
[58] Field of Search ............... 428/368, 399, 400, 401, 428/373, 374, 392, 394, 395, 375, 376, 294, 295, 74

[56] References Cited

U.S. PATENT DOCUMENTS

| | | | |
|---|---|---|---|
| 3,463,652 | 8/1969 | Whitesel et al. | 428/401 |
| 3,540,203 | 11/1970 | Thoresen et al. | 428/390 |
| 3,733,246 | 5/1973 | Thomson | 428/401 |
| 3,953,637 | 4/1976 | Phillips | 428/295 |
| 3,956,564 | 5/1976 | Hillig | 428/368 |
| 4,362,069 | 12/1982 | Giatras et al. | 428/372 |
| 4,489,129 | 12/1984 | Shue et al. | 428/368 |
| 4,614,678 | 9/1986 | Ganga | 428/373 |

OTHER PUBLICATIONS

Derwent Abstract, 85-244182/40.
Derwent Abstract, 85/244181/40.

*Primary Examiner*—Sharon A. Gibson
*Attorney, Agent, or Firm*—Lorusso & Loud

[57] ABSTRACT

A flexible composite material comprising a core composed of a blend of a thermoplastic resin fiber and a reinforcing fiber, and a flexible sleeve formed of a thermoplastic resin and surrounding the core. The composite material may be prepared by intermixing a thermoplastic resin fiber and a reinforcing fiber to obtain a core, and then extruding a thermoplastic resin over the core.

6 Claims, 2 Drawing Sheets

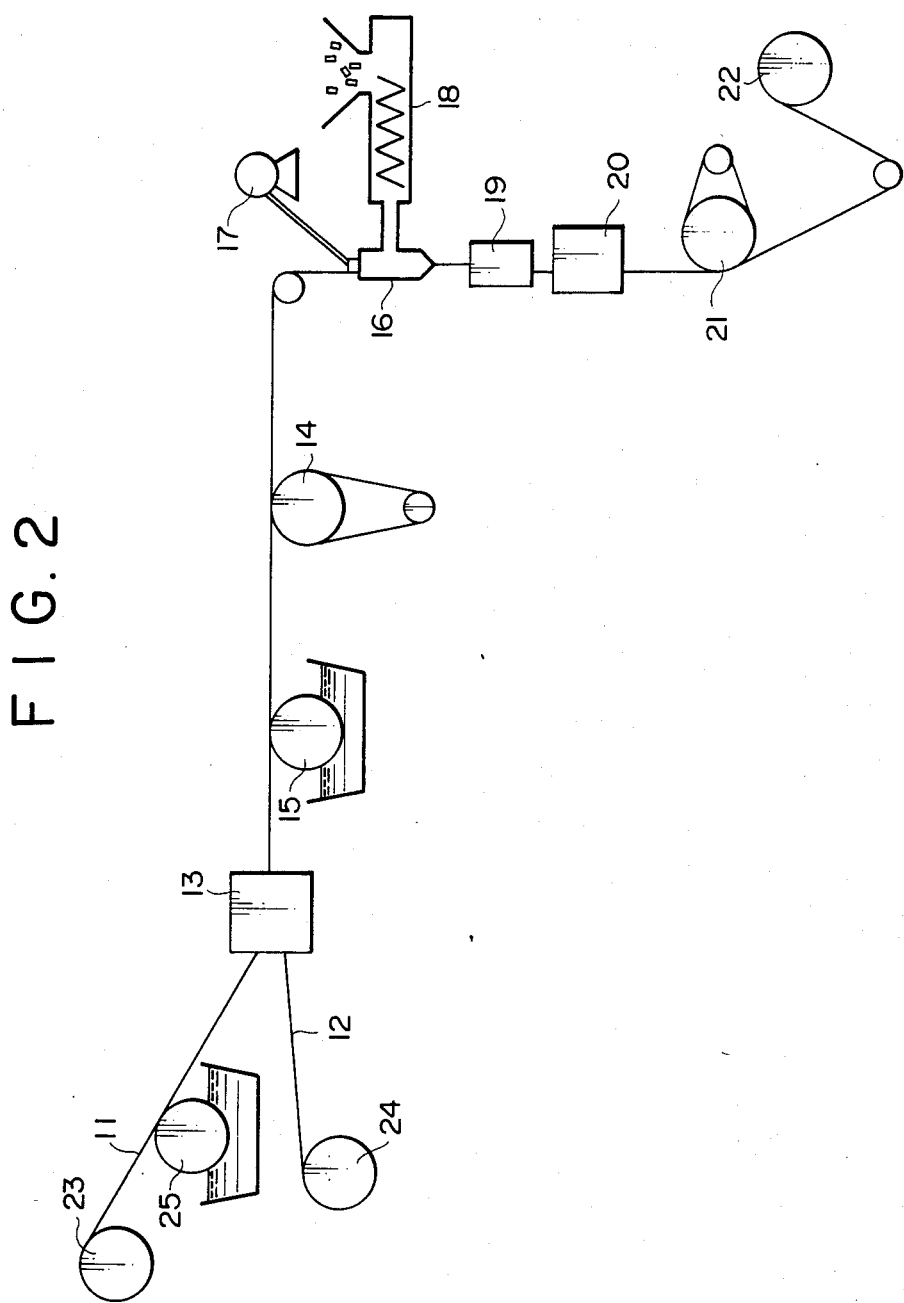

FLEXIBLE COMPOSITE MATERIAL AND PROCESS FOR PREPARING SAME

This invention relates to a flexible composite material useful for the molding of composite articles.

Well known composite materials include prepreg in the form of a tape or a woven cloth formed by coating with a solution of a thermosetting resin or a low-viscosity molten thermosetting resin on a tow or a woven cloth of carbon fibers or by covering the tow or the woven cloth with a solution of the low-viscosity molten material. The prepreg is extremely high in adhesion and poor in flexibility so that it has problems with handling and postprocessing. A tape of a carbon fiber-containing thermoplastic resin prepared by extruding a carbon fiber tape in which a thermoplastic resin having a high melting point is impregnated is also known; however, the carbon fiber-containing thermoplastic resin tape is in the state of an extremely rigid board so that it may cause difficulties in the formation of woven clothes and moreover it cannot be subjected to drape forming through molds with complex shapes.

In order to overcome drawbacks as described above, there have recently been proposed a continuous fiber tow (European Publication No. 156599A and No. 156600A) which is formed from a tight blend of about 90% to 30% by volume of spun fibers of a thermoplastic polymer and about 10% to 70% by volume of carbon fibers or non-thermoplastic reinforcing fibers, each based on the total fiber content and a flexible composite material (European Publication No. 133825A) which is formed by covering coarse fiber filaments impregnated by a thermoplastic resin powder with a flexible covering material. The composite materials are suitable for draping through molds with complex shapes in terms of flexibility as compared to known carbon fiber-containing thermoplatic resin tapes; however, they have still drawbacks as will be described below.

The former, on the one hand, may have a fuzzy surface so that the step of weaving clothes is rendered difficult. It also leads to the formation of a large amount of fuzz on the resulting woven clothes, thereby making it difficult of to provide woven clothes of practical value. Furthermore, as carbon fibers are exposed on the surface of the composite material, the fibers are easily damaged during the handling and fuzzed. Moreover, it has an additional disadvantage that the material properties of the resulting molded products are impaired because the thermoplastic resin fibers and the carbon fibers used are exposed to the atmosphere so that air and moisture are allowed to permeate through the spaces among the fibers.

The latter, on the other hand, presents the difficulty of quantitatively determining blending ratios of the reinforcing fibers and the thermoplastic resin powders because the thermoplastic resin powders adhere to the coarse fiber filaments (reinforcing fibers) using a fluidized layer and so on so that the material properties of the resulting molded products are not uniform. This causes the problem that the material properties are unstable. In instances where the composite material is employed in the form of short lengths or where it is woven in clothes in such a form, it has the difficulty that the resin powders in the sleeve will be scattered during cutting so that the quantitative and uniform properties as a composite material may be impaired and working environment will be worsened. Further, in the production of the composite material, an extremely severe step of producing powdery particles is required so as to define average particle sizes of the powdery particles within a particular range to maintain a fluidized state of the fluidized layer. This will increase the cost of production. As coarse fiber filaments in which the resin powders are impregnated are used, it has the disadvantage because it is hard to tightly bond the coarse fiber filaments to the flexible covering material, leading to the ready permeation in the composite material by air that may cause a decrease in the material properties of the resultant molded products. It also has the problem that the removal of the air from the sleeve is difficult because this will cause the powdery particles to migrate, thus adversely affecting the quantitative and uniform properties of the resultant molded products.

The present invention has the objects to provide a flexible composite material, unlike conventional reinforcing filamentscontaining composite material, that enables blending a reinforcing fiber and a thermplastic resin fiber at a quantitative and uniform rate and processing in an extremely favorable manner, leading to the formation of molded articles with superior mechanical properties such as a tensile strength, bending strength and so on and to provide a process for preparing the flexible composite material in an industrially faborable manner.

In accordance with one aspect of the present invention, there is provided a flexible composite material comprising a a core composed of a blend of a thermoplastic resin fiber and a reinforcing fiber, and a flexible sleeve formed of a thermoplastic resin and surrounding said core.

In another aspect, the present invention provides a process for preparing a flexible composite material, comprising providing a thermoplastic resin fiber and a reinforcing fiber, intimately, blending said thermoplastic resin fiber and said reinforcing fiber, assembling said blended fibers to form a core, and extruding a thermoplastic resin over said core to form a thermoplastic resin sleeve surrounding said core.

The flexible composite material according to the present invention allows a free and quantitative determination of blending ratio for the reinforcing fiber and the thermoplastic resin fiber, unlike the case wherein a thermoplastic resin in the form of powder is employed, because a blend of the reinforcing fiber and the thermoplastic resin fiber is used as a core material and a flexible sleeve made from a thermoplastic resin is provided around the core material. As the resultant blended fiber bundle is superior in flexibility, quality and unformity, the flexible composite material according to the present invention can provide molded articles with superior mechanical properties such as a tensile strength, bending strength and so on.

Also the flexible composite material according to the present invention is provided with a flexible sleeve made from the thermoplastic resin around the core material as described above so that it can prevent air or moisture from permeating into the flexible composite material, thereby providing a remarkable improvement in the mechanical properties of the resulting molded articles. The flexible composite material does not form fuzz on its surface and no reinforcing fiber is exposed thereon so that the cloth weaving step and handling are rendered easy, thus preventing damage to the reinforcing fiber in the resulting clothes, woven clothes and so on and leading to extremely good post-processing. The reason why the flexible composite material according to the present invention provides the remarkable results as described above is because it is based on a combination of the features incorporated into the present invention is that the blended fiber bundle composed of the reinforcing fiber and the thermoplastic resin fiber is used as a core material and that the flexible sleeve made from the thermoplastic resin is provided around the core material.

On the contrary, without such features, for example, in instances where a thermoplastic resin in the form of powder is employed in the place of the thermoplastic resin fiber, it is difficult to quantitate the blending ratio for the reinforcing fiber and the thermoplastic resin fiber so that a composite material with high quality and uniformity cannot be produced. When such composite material is cut, the powders within the inside are lost so that the quantitative property is further impaired, thus leading to the worsening of the working environment and the rise of production costs. Because of these drawbacks, such conventional composite materials cannot provide the effects as in the flexible composite material according to the present invention. In instances where the bundle of reinforcing fiber and the thermoplastic resin fiber is not surrounded with a sleeve, the blended fiber bundle is exposed directly to air so that air is permeates into spaces among the fibers and the material properties of the resultant molded articles are caused to be decreased, leading to the production of unstable and ununiform molded articles. Since such composite materials may fuzz and the reinforcing fiber is thereby exposed on the surface, the post-processibility becomes extremely poor so that the objects of the present invention cannot be achieved.

The flexible composite material according to the present invention will be described in detail with reference to the accompanying drawings, in which:

FIG. 1 is a fragmentary, perspective view, cut away in part, schematically showing a flexible composite material according to the present invention; and FIG. 2 is a diagrammatic illustration of an apparatus suitable for the preparation of the composite material of the present invention.

Referring to FIG. 1, the reference numeral 1 designates a blended fiber bundle or core surrounded by a flexible thermoplastic resin sleeve 2. The blended fiber core 1 is composed of a thermoplastic resin fiber 3 and reinforcing fiber 4. The filaments of the two fibers 3 and 4 are each generally continuous and are substantially uniformly distributed in the plane perpendicular to the axis of the core 1.

The amount of the thermoplastic resin fiber 3 and the reinforcing fiber 4 in the core may vary with the purpose for or the manner of using the flexible composite material and may preferably range from about 1% to about 89% by volume and from about 99% to about 11% by volume, respectively, based on the total fiber content. If the blending ratio of the thermoplastic resin fiber 3 to the reinforcing fiber 4 is below the above range, it is not preferred because molded articles with high quality and uniformity cannot be produced. If they exceed the above range, it is not preferred, too, because the reinforcing effect to be created by the reinforcing fiber cannot be obtained. More preferably, the amount of the thermoplastic resin fiber 3 is from about 15% to about 30% and the amount of the reinforcing fiber 4 is from about 85% to about 70%, each based on the total fiber content.

The thickness of the flexible sleeve 2 made from the thermoplastic resin may range preferably from about 5 to about 2,000 $\mu$m and, more preferably, from about 10 to about 200 $\mu$m. A thickness of the sleeve below about 5 $\mu$m is not preferred because it then becomes difficult to form a uniform sleeve. On the other hand, if it exceeds about 2,000 $\mu$m, the object of the present invention cannot be performed because the desired flexibility of the composite material is lost.

In the flexible composite material according to the present invention, the denier numbers of the filaments of the thermoplastic resin fiber may range generally from about 0.001 to about 50 per each filament. In order to provide the flexible composite material fo higher quality, it is desired that the denier numbers range from about 0.03 to about 1. Although the number of the filaments may conveniently vary with the denier numbers of the filaments, it may range generally from about 5 to about 20,000,000 and, more preferably, from about 10 to about 100,000.

The reinforcing fiber to be used for the present invention may be one having a filament denier number ranging from about 0.05 to about 600 and the number of filaments ranging from about 50 to about 300,000 and preferably having a filament denier number ranging from about 0.25 to about 16 and the number of filaments ranging from about 100 to about 48,000.

The diameters of the thermoplastic resin fiber to be used for the present invention may range generally from about 0.5 to about 60 $\mu$m and preferably from about 2 to 11 $\mu$m, while the diameters of the reinforcing fiber may range generally from about 3 to about 50 $\mu$m and preferably from about 6 to about 30 $\mu$m. It is generally preferred to use a thermoplastic resin fiber having a filament size smaller than that of the reinforcing fiber, because the the thinner the thermoplastic resin fiber filaments, the greater becomes the number of the filaments and, thus, the unformity of the fiber blend is improved.

The flexible composite material according to the present invention is superior into mechanical strength when molded in articles because air and moisture are unlikely to permeate thereinto because the blended fiber bundle 1 composed of the thermoplastic resin fiber 3 and the reinforcing fiber 4 is used as a core material and a flexible sleeve 2 made from the thermoplastic resin is provided over the surface of the core material 1 as described above.

In accordance with the present invention, the blended fiber bundle 1 and the sleeve 2 can be closely bonded to each other when the step of covering the core with the sleeve is performed while keeping the core under vacuum using a deairing pump, as described hereinafter, so that molded artocles having superior mechanical strength can be produced. Such a flexible composite material in which the blended filaments bundle 1 is closely bonded to the sleeve 2 is particularly suitable for a filament winding molded material as will be described below and is molded into articles requiring high quality. In the composite material according to the present invention, it may be possible to provide an arbitrary number of annular knots or depressions thereon using a stamping or hot pressing device in order to maintain the close bonding between the sleeve 2 and the blended fiber bundle 1. The composite material of this shape is suitable, for example, in instances where it is used after cutting into short lengths between each adjacent knots.

The thermoplastic resin fiber to be used for the present invention may be formed of polymers such as polyamides, polyesters, polyethylenes, polypropylenes, polyvinylidene fluorides, polamideimides, polyimides, polyetherimides, polyethersulfones and polyeretherketones. More specifically, the polyamide may include homopolymers or copolymers such as nylon 66, nylon 6, nylon 12 and nylon 6/66/12 terpolymer. The polyester may include homopolymers or copolymers such as polyethylene terephthalate, polybutylene terephthalate, polyethylene-2,6-naphthalate, polyoxyethoxybenzo-ate and aromatic polyester.

As the reinforcing fiber 4 to be used for the present invention may be employed a carbon fiber, a glass fiber or a polyamide fiber. More specifically, the carbon fibers may be divided basically into two groups according to the difference in the raw material to be used. Of one group is one prepared by carbonizing petroleum pitch or coal tar pitch used as raw materials. The other group is one prepared by carbonizing natural or synthetic fibers used as raw materials. Any one of these groups may be employed for the present invention. In instances where the pitch is employed as a raw material, the pitch is prepared so as to be in such a state as being suitable for a spinning material and then converted into fibers, followed by being subjected to infusibilization and carbonization. For example, the pitch prepared to have softening points ranging from 180° to 300°C. is molten spun at temperatures from 250° to 350° C., then subjected to infusibilization at temperatures from 150° to 300° C. using an oxidizing gas and carbonized at temperatures from 800° to 2,500° C. In instances where fibers are used as raw materials, cellulose or acrylic fibers, particularly acrylonitrile copolymer fibers, are used as raw materials. They are subjected to a heat treatment and then carbonized. Particularly suitable for the present invention are carbon fibers prepared from pitch.

The thermoplastic resins to be used as a material forming the flexible sleeve 2 according to the present invention may include a polymer such as polyamide, polyester, polyethylene, polypropylene, polyvinylidene fluoride, polyamidimide, polyimide, polyether imide, polyether sulphone or polyetheretherketone. More specifically, the polyamides may include a homopolymer or copolymer such as nylon 66, nylone 6, nylon 12, nylon 6/66/12 terpolymer. The specific polyesters may include polyethylene terephthalate, polybutylene terephthalate, polyethylene-2,6-naphthalate, polyoxyethoxybenzoate or aromatic polyester. The melting points of the thermoplastic resins to be used as the sleeve-forming material are preferably equal to or lower than those of the thermoplastic resin fibers 3.

The processes of the preparation of the flexible composite material will be described more in detail hereinbelow.

The process for preparing the flexible composite material comprises the steps of blending a thermoplastic resin fiber bundle and a reinforcing fiber bundle and then covering the resultant blended fibers with a thermplastic resin so as to form a sleeve around the blended fiber bundle.

Referring now to FIG. 2, a bundle of a reinforcing fiber 11 and a bundle of a thermoplastic resin fiber 12 wound on bobbins (not shown) are continuously drawn at a constant speed by a Nelson type feed roller 14 through a fiber blending device 13. The fiber blending device 13 may be of any conventional type and is not specifically shown herein. Briefly, the device 13 is composed of air nozzles and an intermixing means. Designated as 23 and 24 are unwinding equipments for controlling the feed of the fibers.

The two different fiber bundles supplied to the blending device 13 are uniformly spread or separated by the aid of dry air blown from the nozzles and then caused to go into contact with each other for intermixing. During the blending, a tension of 2 grams or higher, for example, is applied to the fibers 11 and 12. The blended fiber bundle obtained in the blending device 13 is transferred to a sleeve-covering device composed of a thermoplastic resin extruder 18 and a sleeve-covering cross bed 16 and is covered there with the flexible thermoplastic resin supplied to the extruder 18.

The composite material provided with the sleeve is then cooled and solidified by a cooling device 20 followed by drawing at a constant speed by means of a Nelson type feed roller 21 and winding by means of a take-up device 22. The reference numerals 15 and 25 denote sizing rollers which are preferably disposed for surface-treating the reinforcing fiber bundle and the blended fiber bundle, respectively, for the purpose of preventing fuzz from forming on the bundles and of increasing the tension of the bundles. The sizing agent to be used for the sizing may also serve to function as a converging agent during the formation of the composite material and also as a binder between the reinforcing fiber and the thermoplastic resin fiber during the molding of the composite material.

In accordance with the present invention, in instances where the sizing rollers 15 and 25 are employed, the production efficiency can be increased to a considerably great degree and there can be produced the blended fiber bundle in which the thermoplastic resin fiber is closely bonded to the reinforcing fiber and also the molded articles in which the thermoplastic resin is closely bonded to the reinforcing fiber.

In FIG. 2, the reference numeral 17 designates a deairing pump, and the pump is useful for the production of composite material in which the core 1 (FIG. 1) of the blended filaments bundle is in close contact with the thermoplastic resin sleeve 2 (FIG. 1) and, hence, for the production of molded articles having an extremely small porosity. That is, by connecting the pump 17 to the cross bed 16, the blended fiber bundle is maintained under vacuum so that interstices between the blended fibers and between the fibers and the sleeve may be reduced to provide tight bonding between the fibers and between the core and the sleeve.

Designated as 19 is a stamping or knot forming device, and it is useful for the production of the composite material according to the present invention suitable for being cut into a multiplicity of short lengths. The stamping device 19 can form a plurality of axially spaced apart annularly depressed portions or grooves on the outer periphery of the sleeve by radially inwardly pressing, with heating, the composite material drawn from the sleeve forming step, whereby the sleeve and the fibers are tightened together at the pressed portions. As a result, when the composite material is cut into short lengths at positions other than the pressed portions, the cut fibers are prevented from separating from each other or from the sleeve and remain bound together. In accordance with the present invention, in addition to the blending device as described above, various types of fiber blending devices conventionally used as fiber blending devices of this type may be conveniently employed for the present invention, and such devices may include, for example, an air processor or the like.

The composite material according to the present invention may be used as a filament winding material or a pressurized molding material. In the case of filament winding, the composite material according to the present invention is wound on a mandrel or a former, heated under pressure at temperatures higher than that of the thermoplastic resins by heating means so as to melt or fuse the thermoplastic resins of the sleeve and the thermoplastic fibers and then resolidified. Thereafter the mandrels and formers are removed. The mandrels may become part of the molded products. In the case of the pressurized molding, the composite material may be placed on a mold, heated at temperatures higher than the melting point of the thermoplastic resin under pressure to melt the thermoplastic resin and the reinforcing fiber integrally thereto, and then resolidified. Thereafter the composite material may be molded into molded articles.

By using the composite material according to the present invention, there may be produced a solid molded article in which the reinforcing fiber is dispersed to a sufficient degree. It permits the easy production of products of complex dimensional shapes and of a small radius of curvature.

The composite material according to the present invention may be molded by molding means such as the filament winding method and the pressurized molding method into structural parts for automobiles, tennis racket frames, hockey sticks, skiing stocks, fishing rods, golf club shafts and so on. Furthermore, the composite material in the fiber form according to the present invention may be molded into mats in combination with other fibers by means of conventional weaving methods.

The flexible composite material according to the present invention may be prepared by blending the thermoplastic resin fiber and the reinforcing fiber in arbitrary and quantitative blending ratios because, as described above, the blended fiber bundle composed of the thermoplastic resin fiber and the reinforcing fiber is used as a core material and a flexible sleeve made from the thermoplastic resin is provided around the core material. The article of the present invention is of further value because it is superior in post-processibility and flexibi-lity, whereby molded articles with extremely high tensile strength and bending strength characteristics are produced. The process for the preparation of the flexible composite material according to the present invention is also industrially favorable because it can reduce the number of steps and it requires the use of only simple apparatus.

The following examples will further illustrate the present invention.

EXAMPLE 1

A bundle and pellets of nylon 66 were prepared using a polymer prepared from hexamethylene diamine/adipic acid (HA salt) as a base material. The density of this nylon 66 was 1.14 g/cc, and the bundle was composed of 600 filaments of 3 denier each. Its tensile strength was 6.4 kg/mm$^2$, and the elongation was 38%. The reinforcing fiber to be blended with the nylon 66 fiber was a bundle of carbon fiber made from petroleum pitch. The carbon fiber bundle was composed of 6,000 filaments and had a density of 1.71 g/cc, a tensile strength of 310 kg/mm$^2$, a tensile elastic modulas of $22 \times 10^3$ kg/mm$^2$, and an elongation of 1.4%. The carbon bundle and the nylon 66 bundle would on bobbins were continuously drawn through the fiber blending device 13 by the Nelson type feed roller 14 at a constant speed to obtain a blended fiber bundle composed of 64% by volume of the carbon fiber and 36% by volume of the nylon 66 fiber.

The fiber blending device 13 was composed of air nozzles and a fiber intermixing means. The two fibers supplied were each spread by blowing dry air from the nozzles, and both spread fibers were passed through two small long fixed plates vertically arranged in parallel with each other to effect intermixing of the two fibers. During this step, a tension of about 30 grams was applied to the fibers using a sensor.

The blended fiber bundle thus formed was then transferred to a sleeve-covering device composed of the thermoplastic resin extruder 18 and a sleeve-covering cross head 16. During this step, the pellets of nylon 66 prepared above were supplied to the extruder 18 so as to form a sleeve around the blended fiber bundle, the product was then cooled by means of the cooling device 20 to solidification, the product was drawn at a constant velocity by means of the Nelson type feed roller 11, and then it had wound by the winding apparatus 22. The extruder 18 was a screw diameter of 20 mm and an extruding velocity of 0.34 liter/hour, and the temperature of the cross head die was set at 281° C. and the drawing velocity at 10 m/minute.

The resulting sleeve surrounding the blended fiber bundle had an inner diameter of 5 mm, a thickness of 36 μm and a volume of 47% based on of the volume of the carbon fiber. The resultant composite material was woven using a rapier loom to give a plain woven cloth of high quality without any fuzz and without carbon fibers exposed on the surface thereof.

The composite material was also wound so as to be closely bound to a thickness of about 6 mm on an aluminum alloy plate having a width of 200 mm and a thickness of 5 mm and then placed into a mold of a pressure molding apparatus. The mold was heated to 280° C. and kept for 5 minutes, and then a pressure of 32 kg/cm$^2$ was applied for 20 minutes. The mold was then cooled to ambient temperature while the pressure was kept applied. The resultant molded product was removed from the mold and cut into test pieces of 175 mm×20 mm×3 mm and 80 mm×25 mm×3 mm, rspectively, so as to allow the carbon fibers to be positioned in the lengthwise direction. Using 20 test pieces each, the tensile and the bending tests were conducted. The average tensile strength for 20 test pieces was found to be 105.7 kg/mm$^2$ and the bending strength was 91.4 kg/mm$^2$.

EXAMPLE 2

Test pieces were prepared by following Example 1 with the exception that the number of nylon 66 fiber filaments was 3,400 and the denier number per filament was 0.5. The test results were: tensile strength of 149.6 kg/mm$^2$ and bending strength of 131.3 kg/mm$^2$. These figures are higher than those of Example 1, and they show that a more uniform composite material was given.

EXAMPLE 3

A blended fiber bundle composed of 74% by volume of carbon fiber and 26% by volume of nylon 66 fiber was prepared by following Example 1 with the exception that the number of nylon 66 fiber filaments was changed to 370 and the denier number per filament was changed to 0.5. Using this blended filaments bundle, a composite material was prepared in the same manner as in Example 1 and test pieces were likewise given. The tensile strength was found to be 120.8 kg/mm$^2$ and the bending strength was 112.2 kg/mm$^2$. The composite material was found to contain carbon fibers in a higher content than that obtained in Example 1 and be superior to that of Example 1.

EXAMPLE 4

A composite material was prepared in substantially the same manner as in Example 1 with the exception that the sleeve forming step was performed using the deairing pump 17 so as to closely bind the blended fiber bundle composed of the nylon 66 fiber and the carbon fiber. Test pieces were then likewise produced, and their tensile strength was found to be 138.4 kg/mm$^2$ and the bending strength of 130.1 kg/mm$^2$. This shows that a porosity of the molded product was reduced.

EXAMPLE 5

A composite material was prepared by following Example 1 with the exception that the tension before and after the fiber blending device 13 was changed to about 75 grams. This made it possible to set the extruding velocity at 2.04 liters/hour and the final drawing velocity at 60 meters/minute, leading to a remarkable increase in productivity. The tensile strength was found to be 104.9 kg/mm$^2$ and the bending strength was 91.8 kg/mm$^2$.

EXAMPLE 6

A composite material was prepared by following Example 1 with the exception that the carbon fiber bundle was surface treated by the sizing roller 25 and the blended fiber bundle by the sizing roller 15 and the tension before and after the fiber blending device was changed to about 50 grams. This permitted the extruding velocity to be set at 2.72 liters/hour and the final drawing velocity at 80 meters/minute, leading to a remarkable increase in producing speed. The tensile strength was found to be 109.2 kg/mm$^2$ and the bending strength was 90.3 kg/mm$^2$.

EXAMPLE 7

A composite material was prepared in substantially the same manner as in Example 1 with the exception that the sleeve was closely bonded to the blended fiber bundle composed of the nylon 66 fiber and the carbon fiber in which the sleeve forming step was performed under a reduced pressure using the deairing pump 17 and the composite material was provided with knots (annular grooves) at distances at every 10 mm by stamping at a temperature of about 280° C. and a pressure of about 70 kg/cm$^2$ by means of the stamping device 19. The resulting composite material was chopped in the length of 50 mm. Substantially no separation of fibers from the sleeve was observed. The chopped material was dispersed in radom directions and laminated to give a composite material in the felt state having a thickness of 4.2 mm. This was heated at 270° C. using a far infrared heater and then inserted into a press mold that was operated under a pressure of 60 kg/cm$^2$, leading to the production of composite products having a variety of curved surfaces.

COMPARATIVE EXAMPLE 1

The blended fiber bundle prepared by the process of Example 1 was wound directly without passage through the sleeve covering device. This was subjected to plain weaving with a rapier loom, resulting in a woven cloth with a remarkable degree of fuzz formed on the surface, and the cloth was found inpractical. Test pieces were prepared in substantially the same manner as in Example 1 and subjected to tests. The results were: tensile strength of 74.2 kg/mm$^2$ and bending strength of 63.1 kg/mm$^2$.

what is claimed is:

1. A flexible composite material comprising a core composed of a blend of from about 15% to about 30% by volume of a thermoplastic resin fiber and about 85% to about 70% by volume of a reinforcing fiber selected from the group consisting of carbon fiber, glass fiber and mixtures thereof, and a flexible sleeve formed of a thermoplastic resin and surrounding said core.

2. A flexible composite material according to claim 1, wherein said thermoplastic resin fiber has a filament denier number in the range of about 0.03 to about 1.

3. A flexible composite material according to claim 1, wherein said reinforcing fiber has a filament denier number in the range of about 0.25 to about 1.

4. A flexible composite material according to claim 1, wherein said sleeve has a thickness in the range of from about 10 to about 200 μm.

5. A flexible composite material according to claim 1, wherein said sleeve is in close contact with the entire periphery of said core.

6. A flexible composite material according to claim 1, and being provided with a plurality of longitudinally equally spaced apart annular pressed portions on the outer periphery of said sleeve, each annular pressed portion being formed by radially inwardly hot pressing the periphery of the sleeve so as to tighten the sleeve and the fibers together.

* * * * *

UNITED STATES PATENT AND TRADEMARK OFFICE
CERTIFICATE OF CORRECTION

PATENT NO. : 4,770,915

DATED : September 13, 1988

INVENTOR(S) : Takao Nakagawa et al.

It is certified that error appears in the above-identified patent and that said Letters Patent is hereby corrected as shown below:

Column 1, line 7, "prepreg" should read -- prepregs --.

Column 2, line 4, before "fluidized" insert -- stable --.

line 19, "filamentscontaining" should read -- filaments-containing --.

line 44, "ratio" should read -- ratios --.

Column 3, line 26, delete "is", second occurrence.

Column 4, line 14, "fo" should read -- of --.

line 38, "unformity" should read -- uniformity --.

Column 5, line 60, "therm-" should read -- thermo- --.

Signed and Sealed this

Twenty-ninth Day of August, 1989

Attest:

DONALD J. QUIGG

Attesting Officer

Commissioner of Patents and Trademarks